Jan. 29, 1935. F. C. FRANK 1,989,188
WHEEL
Filed June 16, 1930
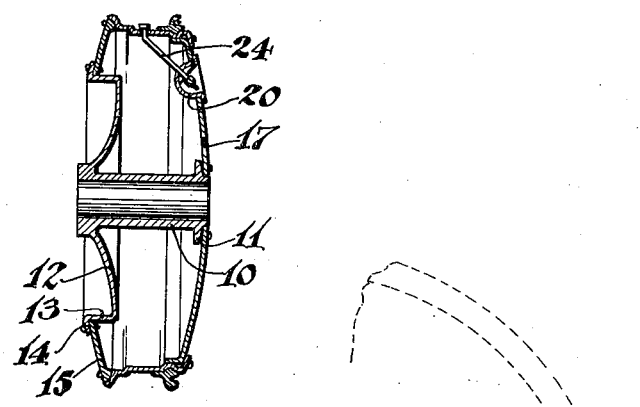
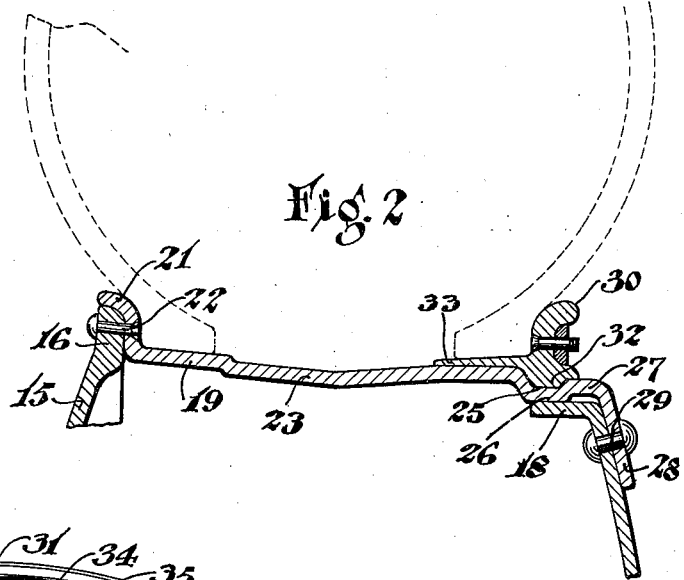
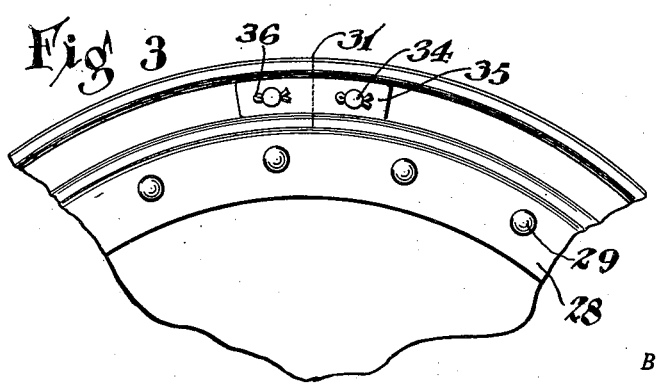
INVENTOR.
Frederick C. Frank
BY
M. W. McConkey
ATTORNEY Patented Jan. 29, 1935

1,989,188

UNITED STATES PATENT OFFICE 1,989,188

WHEEL

Frederick C. Frank, South Bend, Ind., assignor to Bendix Brake Company, South Bend, Ind., a corporation of Illinois Application June 16, 1930, Serial No. 461,337

2 Claims. (Cl. 301—63)

This invention relates to wheels and more particularly to airplane wheels.

An object of the invention is to generally improve rim structures.

Another object of the invention is to provide a demountable rim.

Another object of the invention is to provide a wheel rim having a removable tire retaining bead.

A further object of the invention is to provide a rim having reinforcing flanges.

A further object of the invention is to provide a rim having a demountable retaining tire bead provided with a strengthening web or flange.

Yet a further object of the invention is to provide a disc wheel having strengthening or stiffening parts and a rim associated therewith having reinforcing flanges secured to the stiffening parts to more effectively withstand stress or strains which may be imposed upon the wheel.

Other objects of the invention will appear from the following description taken in connection with the drawing, which forms a part of this specification, and in which:

Figure 1 is a vertical sectional view of a wheel embodying the invention.

Figure 2 is an enlarged detailed view illustrating the rim, the retaining beads and the relation of the rim to the discs of the wheel; and Figure 3 is an enlarged detailed view illustrating the means for securing the separable ends of the tire retaining bead together.

Referring to the drawing for more specific details of the invention, 10 represents a hub having on one end a circumferential flange 11 and on the other end a dished disc 12, supporting a drum 13, having a circumferential flange 14, to which is riveted or otherwise secured a disc section 15, having on its periphery, a bead 16, which lends strength and rigidity to the structure.

Suitably secured to the flange 11, as by rivets, is a disc 17 having a peripheral flange 18 adapted to stiffen the disc and to provide a seat for rim 19. The disc 17 is also provided with an opening in which is seated a cup 20, the object of which will hereinafter appear.

The rim 19, has a flange 21 overlapping the bead 16 and secured thereto as by rivets 22. This flange provides a retaining bead for a tire and is reinforced by the bead on the disc section. The rim has an offset portion providing a drop center 23 and a conventional tire stem tube 24 extends through an opening in the drop center to the cup 20 in the disc 17.

As shown, the rim is formed or cast with a groove 25 having one wall somewhat deeper than the other and that portion of the rim forming the groove has a substantial shoulder 26, seated on the flange 18 on the discs 17. Adjacent the shallow wall of the groove 25, is a ledge 27 terminating in a flange 28 imposed upon the disc 17 and secured thereto as by rivets 29 or other suitable securing means.

A removable or demountable tire bead 30 is shown seated in the groove 25. This tire bead is split as indicated at 31 so that it may be readily sprung into and out of position. The base of the tire bead 30 has a bead 32 seated snugly in the groove 25 and a lip or flange 33 flapped against the periphery of the rim. This lip provides a suitable seat for the tire bead and materially assists in securing the retaining bead in position. It further facilitates in the removal of the tire, and in addition thereto completes the drop center 23, though this drop center is by no means essential.

As an additional securing means, the separable ends of the tire retaining bead have positioned therein studs 34 on which is fitted a plate 35 secured in position as by cotter pins 36 or other suitable securing means.

Although this invention has been described in connection with certain specific embodiments, the principles involved are susceptible to numerous other applications that will readily occur to persons skilled in the art. The invention is, therefore, to be limited only as indicated by the scope of the appended claims.

Having thus described the features of the invention, what I claim as new and desire to secure by Letters Patent is:

1. A double disc wheel comprising a relatively flat cylindrical rim member having an out-turned flange at one edge and an in-turned flange at the other, an annular groove in said rim near the in-turned flange edge, a disc member having an axially extending flange supporting the underside of said annular groove inside of said rim, said disc being secured to said in-turned flange by rivet means, and a second disc member spaced from the first and secured to the out-turned rim flange by rivet means.

2. A double disc wheel comprising a relatively flat cylindrical rim member having an out-turned flange at one edge and an in-turned flange at the other, an annular groove in said rim near the in-turned flange edge, a disc member having an axially extending flange supporting the underside of said annular groove inside of said rim, said disc being secured to said in-turned flange by rivet means, a second disc member spaced from the first and secured to the out-turned rim flange by rivet means, and a tire retaining locking ring having a bead supporting flange portion, said ring adapted to rest on said rim member, and having an annular ridge centrally located on the underside thereof adapted to seat in said annular groove.

FREDERICK C. FRANK.